Patented May 26, 1936

2,042,205

UNITED STATES PATENT OFFICE 2,042,205

5-TERTIARYBUTYL - 1 - MERCAPTO-BENZO-THIAZOLE AND METHOD OF MAKING SAME

Edgar C. Britton and Andrew J. Dietzler, Midland, Mich., assignors to The Dow Chemical Company, Midland, Mich., a corporation of Michigan No Drawing. Application July 5, 1935, Serial No. 29,970

5 Claims. (Cl. 260—44)

This invention concerns a new compound, viz., 5-tertiarybutyl-1-mercapto-benzo-thiazole having the formula

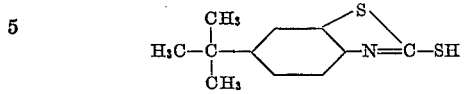

and a method of making the same, which compound is useful as an accelerator for the vulcanization of rubber, and for other purposes.

We prepare 5-tertiarybutyl-1-mercapto-benzothiazole by heating a mixture of para-tertiarybutyl-aniline, carbon bisulphide, and sulphur under pressure in a closed reactor, preferably with agitation, to a temperature at which reaction occurs. The para-tertiarybutyl-aniline, carbon bisulphide, and sulphur may be employed in any desired proportions, but ordinarily we prefer to use approximately 1 atomic weight of sulphur and slightly more than 1 molecular weight of carbon bisulphide per mole of para-tertiarybutyl-aniline. The reaction usually proceeds most smoothly and rapidly at temperatures in the neighborhood of 250° C., but may be carried out at lower or higher temperatures, if desired. During the heating operation, hydrogen sulphide, which is formed as a by-product of the reaction, is released continuously or intermittently in amount sufficient to avoid the building up of excessively high and dangerous pressures. In general we prefer to release the hydrogen sulphide at such rate as to maintain the reacting mixture under pressures in the neighborhood of 800-850 pounds per square inch. The reaction is usually complete after from 3 to 10 hours of heating under the conditions just described.

The reactor is then cooled, the charge removed therefrom and dissolved in an aqueous solution of an alkali, e. g., sodium or potassium hydroxide or a corresponding carbonate. The resultant solution is preferably decolorized by treatment with activated charcoal, bleaching earth, or other bleaching agent, after which it is acidified, e. g., with sulphuric, hydrochloric, or other acid, to precipitate the 5-tertiarybutyl-1-mercapto-benzo-thiazole product. The latter is separated, e. g., by filtration, and dried. When pure para-tertiarybutyl-aniline is used in the process, the 5-tertiarybutyl-1-mercapto-benzo-thiazole product is usually obtained directly in substantially pure form. When necessary, however, the product may be further purified by recrystallization from an organic solvent such as ethyl alcohol, butyl alcohol, chloroform, chlorbenzene, etc., or by redissolving the same in a dilute alkali solution and again precipitating the product with acid as described above.

The following example describes our new product and one way of preparing the same, but is not to be construed as limiting the invention:

A mixture of 57.1 grams (0.75 mole) of carbon bisulphide, 114 grams (0.76 mole) of para-tertiarybutyl-aniline, and 24.5 grams (0.765 gram atom) of sulphur was heated under pressure with agitation in a steel bomb at 249–254° C. for 5½ hours. Hydrogen sulphide, a by-product of the reaction, was liberated from time to time during the heating operation, at such a rate as to maintain the pressure at approximately 800 pounds per square inch. The bomb was then cooled and the contents dissolved therefrom with 900 grams of a hot 10 per cent by weight aqueous sodium hydroxide solution. The resultant solution was diluted to a volume of 4 liters with water, stirred for 10 minutes at room temperature with 10 grams of activated charcoal and 20 grams of an infusorial earth, and filtered. The filtrate was rendered slightly acid to Congo red by addition of a dilute hydrochloric acid solution whereby the 5-tertiarybutyl-1-mercapto-benzo-thiazole product was precipitated. The mixture was filtered and the residue washed with water and air dried. The product so obtained was a light brownish yellow powder weighing 132 grams, the yield being approximately 77.5 per cent of theoretical. The product was purified by redissolving it in an aqueous sodium hydroxide solution, treating the solution with activated charcoal and infusorial earth, and reprecipitating said product with acid as described above, and thereafter recrystallizing the same from n-butanol. The purified 5-tertiarybutyl-1-mercapto-benzo-thiazole was a nearly white crystalline powder melting at approximately 189–190° C. and containing 28.65 per cent by weight sulphur, theory being 28.7 per cent.

Other modes of applying the principle of our invention may be employed instead of those explained, change being made as regards the product and method herein disclosed, provided the compounds or steps stated by any of the following claims or the equivalent of such stated compounds or steps be employed.

We therefore particularly point out and distinctly claim as our invention:

1. In a method of making 5-tertiarybutyl-1-mercapto-benzo-thiazole, the step which consists in heating a mixture of para-tertiarybutyl-aniline, carbon bisulphide, and sulphur under super-atmospheric pressure to a temperature at which reaction occurs.

2. In a method of making 5-tertiarybutyl-1-mercapto-benzo-thiazole, the step which consists in reacting a mixture of approximately one molecular weight of para-tertiarybutyl-aniline, one molecular weight of carbon bisulphide, and one gram atomic weight of sulphur under super-atmospheric pressure at a temperature of approximately 250° C.

3. In a method of making 5-tertiarybutyl-1-mercapto-benzo-thiazole, the steps which consist in heating a mixture of para-tertiarybutyl-aniline, carbon bisulphide, and sulphur to a reaction temperature under super-atmospheric pressure, and during reaction removing hydrogen sulphide from the reaction zone at such rate as to maintain the reacting mixture under a pressure between about 800 and about 850 pounds per square inch.

4. In a method of making 5-tertiarybutyl-1-mercapto-benzo-thiazole, the steps which consist in heating a mixture of para-tertiarybutyl-aniline, carbon bisulphide, and sulphur to a reaction temperature under super-atmospheric pressure, and during reaction removing hydrogen sulphide from the reaction zone at such rate as to maintain the reacting mixture under a pressure between about 800 and about 850 pounds per square inch, and thereafter separating the 5-tertiarybutyl-1-mercapto-benzo-thiazole.

5. 5-Tertiarybutyl-1-mercapto-benzo-thiazole.

EDGAR C. BRITTON.
ANDREW J. DIETZLER.